United States Patent
Milenkovic et al.

(10) Patent No.: US 10,079,507 B2
(45) Date of Patent: Sep. 18, 2018

(54) TECHNIQUES FOR ADAPTIVE DEMAND/RESPONSE ENERGY MANAGEMENT OF ELECTRONIC SYSTEMS

(71) Applicant: Intel Corporation, Santa Clara, CA (US)

(72) Inventors: Milan Milenkovic, Portland, OR (US); Ulf R. Hanebutte, Gig Harbor, WA (US); Vasudevan Srinivasan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 581 days.

(21) Appl. No.: 13/931,442

(22) Filed: Jun. 28, 2013

(65) Prior Publication Data

US 2015/0005974 A1 Jan. 1, 2015

(51) Int. Cl.
  *G05F 1/66* (2006.01)
  *H02J 13/00* (2006.01)
  *H02J 3/38* (2006.01)

(52) U.S. Cl.
  CPC ............ *H02J 13/0079* (2013.01); *H02J 3/38* (2013.01); *Y02E 40/72* (2013.01); *Y04S 10/12* (2013.01)

(58) Field of Classification Search
  CPC . H02J 3/00; H02J 13/0079; H02J 3/38; Y04S 10/12; Y02E 40/72
  USPC ............. 702/63; 700/297, 295, 286; 706/21
  See application file for complete search history.

(56) References Cited

U.S. PATENT DOCUMENTS

| | | | | |
|---|---|---|---|---|
| 5,511,205 A | * | 4/1996 | Kannan | G06F 1/30 712/E9.032 |
| 5,912,544 A | * | 6/1999 | Miyakawa | G01R 19/16542 320/106 |
| 8,067,923 B2 | * | 11/2011 | Daniel | H01M 2/105 320/106 |
| 9,377,837 B2 | * | 6/2016 | Ghose | G06F 1/206 |

(Continued)

FOREIGN PATENT DOCUMENTS

| CN | 101523690 | 9/2009 |
|---|---|---|
| CN | 102142062 | 8/2011 |

(Continued)

OTHER PUBLICATIONS

International Search Report and Written Opinion for PCT/US2014/042971 dated Oct. 10, 2014, 15 pages.

(Continued)

*Primary Examiner* — Chun Cao
(74) *Attorney, Agent, or Firm* — Womble Bond Dickinson (US) LLP

(57) ABSTRACT

Techniques for adaptive demand/response power management. Power consumption and battery charge level of a platform having a battery with a smart power module are monitored. Information indicating the power consumption and battery charge level for the platform is provided to a remote demand/response management device. The remote demand/response management device and the smart power module receive a command to modify one or more power consumption characteristics of the platform. The one or more power consumption characteristics of the platform are to be changed in response to the command.

18 Claims, 5 Drawing Sheets

(56) References Cited

U.S. PATENT DOCUMENTS

| | | | | |
|---|---|---|---|---|
| 2003/0085621 | A1* | 5/2003 | Potega | B60L 11/185 307/18 |
| 2005/0275372 | A1* | 12/2005 | Crowell | H02J 7/0018 320/112 |
| 2007/0124026 | A1* | 5/2007 | Troxell | G06Q 30/08 700/291 |
| 2008/0057894 | A1 | 3/2008 | Aleksic et al. | |
| 2008/0114499 | A1* | 5/2008 | Hakim | H02J 3/32 700/291 |
| 2008/0183307 | A1* | 7/2008 | Clayton | G05B 19/042 700/8 |
| 2010/0004791 | A1* | 1/2010 | West | G06Q 30/04 700/291 |
| 2010/0076706 | A1* | 3/2010 | Elder | B60L 3/0046 702/63 |
| 2010/0156184 | A1* | 6/2010 | Ludtke | H02J 7/0004 307/66 |
| 2010/0208501 | A1* | 8/2010 | Matan | H02J 3/18 363/95 |
| 2011/0153107 | A1 | 1/2011 | Kim et al. | |
| 2011/0035072 | A1* | 2/2011 | Jackson | G06F 1/3203 700/291 |
| 2011/0040990 | A1 | 2/2011 | Chan et al. | |
| 2011/0055036 | A1* | 3/2011 | Helfan | G06Q 30/04 705/26.1 |
| 2011/0082598 | A1* | 4/2011 | Boretto | G06Q 10/06 700/291 |
| 2011/0190953 | A1 | 8/2011 | Park et al. | |
| 2011/0202418 | A1* | 8/2011 | Kempton | B60L 11/1824 705/26.1 |
| 2011/0276192 | A1* | 11/2011 | Ropp | H02J 3/383 700/293 |
| 2011/0320828 | A1 | 12/2011 | Boss et al. | |
| 2012/0130556 | A1* | 5/2012 | Marhoefer | H02J 3/32 700/291 |
| 2012/0239214 | A1* | 9/2012 | Nakashima | H02J 3/32 700/291 |
| 2012/0245744 | A1* | 9/2012 | Prosser | H02J 3/46 700/286 |
| 2012/0331476 | A1* | 12/2012 | Saffre | G06F 9/5038 718/104 |
| 2013/0035802 | A1* | 2/2013 | Khaitan | G06F 1/263 700/297 |
| 2014/0067151 | A1* | 3/2014 | Erhart | G05F 1/66 700/297 |
| 2014/0095091 | A1* | 4/2014 | Moore | H04Q 9/00 702/63 |
| 2014/0285010 | A1* | 9/2014 | Cameron | H02J 1/14 307/29 |
| 2014/0350743 | A1* | 11/2014 | Asghari | G05B 13/048 700/297 |
| 2014/0354234 | A1* | 12/2014 | Sudan | H02J 7/0063 320/127 |
| 2015/0105931 | A1* | 4/2015 | Forbes, Jr. | G06F 1/266 700/297 |
| 2015/0333512 | A1* | 11/2015 | Saussele | H02S 10/20 700/287 |
| 2016/0026194 | A1* | 1/2016 | Mucignat | H04L 12/2825 700/278 |

FOREIGN PATENT DOCUMENTS

| | | |
|---|---|---|
| CN | 103136867 A | 9/2012 |
| JP | 10-158229 | 6/1998 |
| JP | 2011-60169 | 3/2011 |
| JP | 2011129085 | 6/2011 |
| JP | 2011-176416 | 9/2011 |
| JP | 2012-226410 | 11/2012 |
| JP | 2013-116041 | 6/2013 |
| JP | 2013116041 | 6/2013 |
| KR | 10-1078905 | 11/2011 |

OTHER PUBLICATIONS

Office Action and Search Report, with English translation, for counterpart Taiwan Application No. 103121024, dated Jun. 18, 2014, 13 pages.

Written Opinion of The International Searching Authority for counterpart PCT Application No. PCT/US2014/042971, 10 pages, (dated Oct. 10, 2014), 10 pages.

International Preliminary Report on Patentability from PCT/US2014/042971, dated Jan. 7, 2016, 11 pages.

Office Action for Japanese Patent Application 2016-513145 dated Jan. 24, 2017, 4 pages, English translation.

* cited by examiner

TECHNIQUES FOR ADAPTIVE DEMAND/RESPONSE ENERGY MANAGEMENT OF ELECTRONIC SYSTEMS

TECHNICAL FIELD

Embodiments of the invention relate to energy management. More particularly, embodiments of the invention relate to techniques for adaptive demand/response energy management.

BACKGROUND

Smart grid and alternative energy source, for example, wind and solar, require mechanisms to control energy consumption rather than being completely consumption driven as with traditional energy source, for example, coal or natural gas. Some jurisdictions require buildings to be net-zero in terms of energy consumption, or even net-positive. For these buildings, energy consumption can be controlled to stay within a certain energy budget. However, these techniques can result in unsatisfactory individual experiences.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
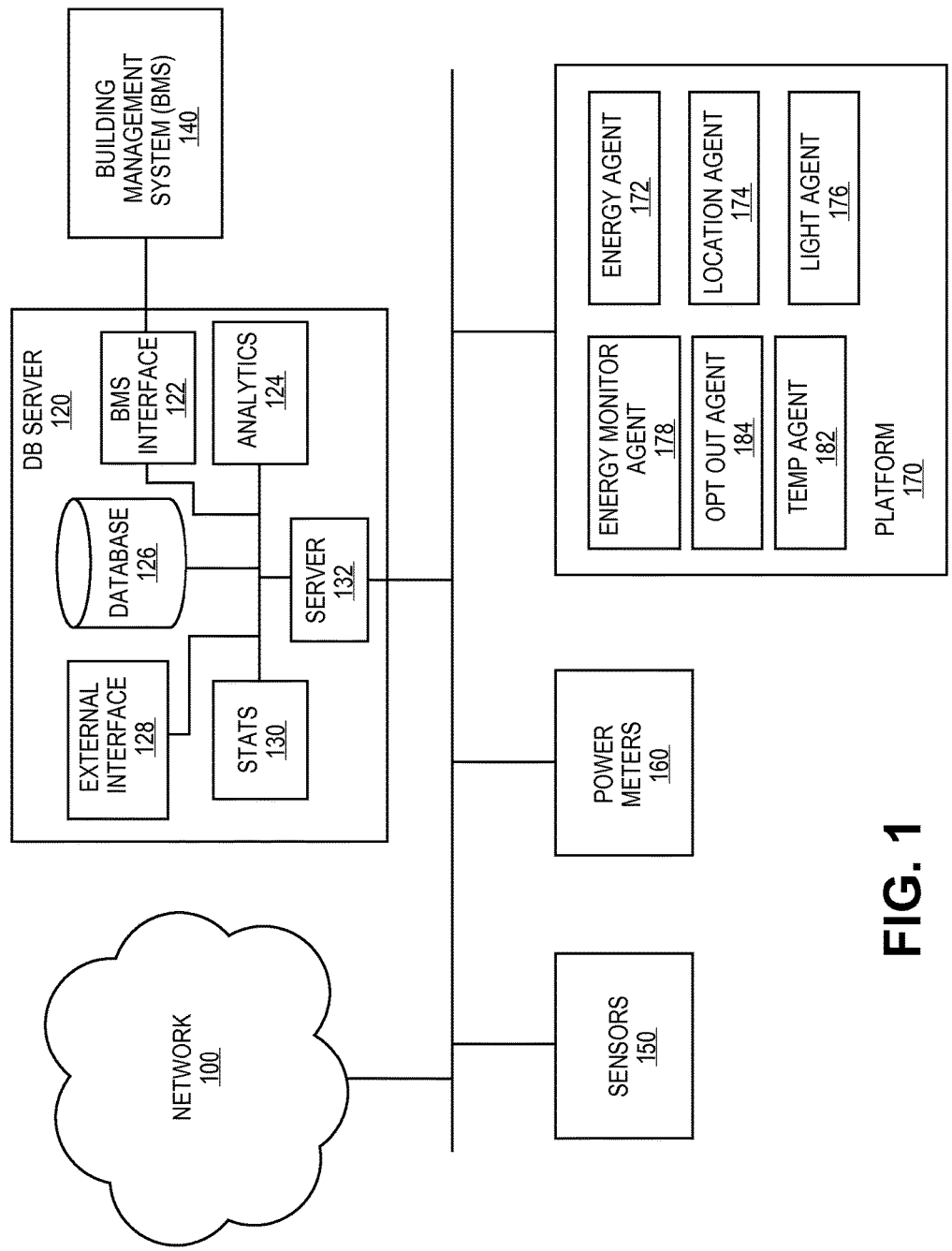
FIG. 1 is a block diagram of one embodiment of an integrated site system with electronic devices that can be managed according to the techniques described herein.

In the following description, numerous specific details are set forth. However, embodiments of the invention may be practiced without these specific details. In other instances, well-known circuits, structures and techniques have not been shown in detail in order not to obscure the understanding of this description.

Described herein are techniques for demand/response (D/R) management for energy consumption of a fleet of power consuming devices (e.g., computer systems, printers, displays, lights) to stay within the appropriate energy budget and to align with available energy. In one embodiment, D/R management is used within the context of dynamic energy pricing or to utilize available local renewable energy at the time of generation without the need to store or to feed back to the grid.

Various fleet management solutions exist that operate to turn systems on and off remotely. These solutions are crude and inflexible as compared to the management techniques described herein. Those previous solutions mostly control energy consumption by turning systems off, thus temporarily making their services unavailable and inconveniencing users. In contrast, the techniques described herein can utilize "smart bricks" and battery power to continue to provide end-user services (which, at times, may be degraded, but functional) while removing electrical loads from the grid to meet control requirements.

The techniques described herein can extend D/R to office computing platforms (and other devices) and support fine-grained grid energy consumption control with quality of service (QoS) guarantees. In one embodiment, this is orchestrated by a group-level D/R fleet manager. The examples provided herein are primarily targeted at computer systems that have energy storage capability (e.g., laptops with batteries, other mobile devices, uninterruptable power supplies (UPSs)). However, the techniques described herein are not limited to these devices and are applicable to any type of electronic system, even those without power storage capability (e.g., printers, scanners, lighting).

The techniques described herein can coupled with other existing and/or emerging management capabilities to provide "demand/response readiness" to support the notion of "green computing," which can bring value to an enterprise in highly efficient buildings that must meet energy targets.

As described herein many electronic devices (e.g., computing systems, tablets, mobile devices) can be aggregated to provide concerted D/R actions. The overall system can continuously aggregated estimates of how much a current energy demand can be reduced by taking controlled devices off the electrical grid for a specified period of time based on the individually reported estimates of the devices within the group.

In one embodiment, each controllable device can calculate its own estimate taking into account, for example, current battery charge level, current energy consumption and/or QoS requirements. If a D/R action is requested, the system can orchestrate a group level response.

This approach simultaneously provides benefits to the D/R manager by virtue of its ability to accurately estimate and enforce energy savings from all included devices in a building or a site, and to users by continuing to provide properly timed and managed useful service even when the devices are disconnected from the power grid. Additional efficiencies may be attained by using control signals from the alternative sources of energy supply to control charging of batteries, for example, by charging batteries only during intervals when there is a surplus of wind or solar energy.

In one embodiment, each managed platform has the capability to communicate with a fleet management solution to provide an automated and seamless D/R capability with at the same time providing QoS guarantees. In on embodiment, a "smart power module" on the each platform, guided by policies, signals from the fleet manager and/or real-time data analysis, controls the power consumption behavior (e.g., batter charging, brightness settings) and makes decisions about when the system should accept power from the grid or when it should be off the grid.

In one embodiment, through policies, minimum system availability and performance can be guaranteed and the aggressiveness of the D/R mechanism can be controlled. This technique provides the ability to balance the need of the user and the D/R requirements. Both local and global optimizations can be supported by this D/R architecture.

In one embodiment, to guarantee system availability for a certain duration of time to the user one or more of the following capabilities are provided: 1) an estimate of the stored energy on the platform (e.g., battery charge level); 2) an estimate of the future energy consumption of the platform under the predicted workload; 3) mechanisms to reduce/limit platform energy consumption; and/or 4) a mechanism to compare the anticipated energy consumption with the available energy and can adapt the platform consumption to the extent possible and/or trigger charging the battery. In one embodiment, predictions for future power consumption can apply safety margins to be conservative.

For example, in one embodiment, the estimate of the future energy consumption of the platform under the predicted workload can be accomplished through machine learning from historical data that is collected by a smart power module to obtain an estimate of the future energy consumption with a relatively high confidence interval. Over time these estimates can increase in accuracy, allowing for safety margins of the QoS mechanism to be relaxed.

FIG. 1 is a block diagram of one embodiment of an integrated site system with electronic devices that can be managed according to the techniques described herein. In one embodiment, the system may utilize the Dynamic Platform Thermal Framework (DPTF) and Personal Office Energy Monitor (POEM); however, the techniques described herein can be implemented without these specific products. Both DPTF and POEM are available from Intel Corporation of Santa Clara, Calif.

The architecture of FIG. 1 allows for a two-way communication between an individual user of a platform and a building infrastructure including a building management system. This may provide for better feedback to a user as well as a better aggregate view of energy consumption.

Network 100 provides an interconnection between multiple electronic devices. Network 100 may provide communication with any number of remote devices not illustrated in FIG. 1. Network 100 may be, for example, the Internet.

Database (DB) server 120 may be coupled with network 100 and other systems. DB server 120 may also be coupled with building management system (BMS) 140 that may include information from, or access to (e.g., request certain actions or information), building systems (e.g., HVAC, electrical, hydraulic, automation) that may provide energy consumption data. DB server 120 may be coupled with BMS 140 via BMS interface 122, which may be one or more wired and/or wireless interfaces.

DB server 120 includes database (DB) 126, which is used to store information retrieved by, sent to, or otherwise acquired by DB server 120. In one embodiment, DB 126 stores energy consumption information gathered from the components illustrated in FIG. 1 as well as any other components. External interface(s) 128 provides one or more wired and/or wireless interfaces between DB server 120 and other sensors or components (not illustrated in FIG. 1).

Statistics 130 may be statistics that are derived by DB server 120 or are provided to DB server 120. Statistics 130 may be used to provide energy consumption information and/or to analyze and derive energy consumption information. Analytics 124 represent logic (e.g., hardware, software, firmware, any combination thereof) that provides analysis of the information stored by DB server 120. For example, analytics 124 may provide macro or micro analysis of energy consumption information as described herein. Server 132 provides services from DB server 120 to devices coupled with DB server 120.

Sensors 150 may be any sensors that provide information to any of the devices of FIG. 1. Sensors 150 may be any type of sensors, for example, temperature sensors, light sensors, wind sensors, etc. Sensors 150 may also include soft sensors, for example, a software agent that provides data in sensor format derived from other forms of data, such as a weather station report. Power meters 160 may be any power meters that provide power information to any of the devices of FIG. 1. Power meters 160 may be any type of power meters that monitor power, for example, at power outlets, light fixtures, or power consumption of any other electrical device.

Platform 170 represents any number of similar platforms that may be coupled with one or more networks interconnected with DB server 120 and/or other devices of FIG. 1. Platform 170 may be, for example, a laptop computer, a desktop computer, or any other device that may be utilized to provide some or all of the information described herein.

In one embodiment, platform 170 includes one or more of the agents illustrated in FIG. 1 in addition to logical and computational components not illustrated in FIG. 1. Energy monitoring agent may 178 provide energy monitoring feedback and functionality to a user of platform 170. Temperature agent 182 may monitor temperature conditions in and/or around platform 170. For example, temperature agent 182 may monitor the ambient temperature of the space in which platform 170 resides, or may monitor the temperature of platform 170. Opt out agent 184 allows a user to opt out of one or more of the energy management mechanism employed by platform 170. In one embodiment, a graphical user interface (GUI) provides information to a user of platform 170 and includes a button/menu/dialog that allows a user to manually opt out of one or more of the features described herein.

Energy agent 172 monitors and/or computes, or otherwise determines energy consumption of platform 170. Energy agent 172 may operate as described herein to determine energy consumption. Location agent 174 operates to determine the position of platform 170. Location agent 174 may use global positioning system (GPS) technology, or other techniques for determining the location of platform 170.

Light agent 176 monitors light levels around platform 170. Light agent 176 may include, for example, an ambient light sensor. Light agent 176 may also calculate or otherwise determine light conditions in and around platform 170.

Conceptually, the techniques described herein operate by tracking the time that the monitored system (e.g., platform 170) spends in various operational states—such as running, idle, off—and by multiplying the time spent in each state with platform power drawn in each state to compute energy usage (energy=power×time). In one embodiment, there is provided (1) the ability to detect operational states of the monitored system and times spent in those operational states, and (2) information related to power consumption in each of the relevant operational states of the monitored system.

This principle may be applied to any electronic equipment or device (e.g., HVAC system) that has operational states with specific energy consumption, such as desktop computers or laptops, by providing a software agent to track platform power state occupancy using, for example, system calls, then compute energy usage by integrating over time state occupancy with power consumed in each state, thus yielding energy consumption in KWh. Non-electrical energy consumption can also be monitored, for example, a state of a heating system may be monitored and energy consumption may be determined by using the state of the heating system along with the amount of natural gas consumed in each state to determine an energy usage. This technique is applicable to other situations as well.

State-specific power usage of individual platforms required by this calculation may be measured by commercial instruments (one time bench/lab measurement per supported platform) or provided as specifications by vendors through machine-readable methods, such as an online web service. Note that vendors already measure and report these kinds of values to standards and rating bodies, such as ECMA and EnergyStar.

The energy-tracking agent(s) may reside on the platform or elsewhere in the infrastructure (e,g, a cloud service or with one device acting as proxy for another—PC for a printer). Currently energy measurement is performed via expensive external hardware power meters.

Figure 2:
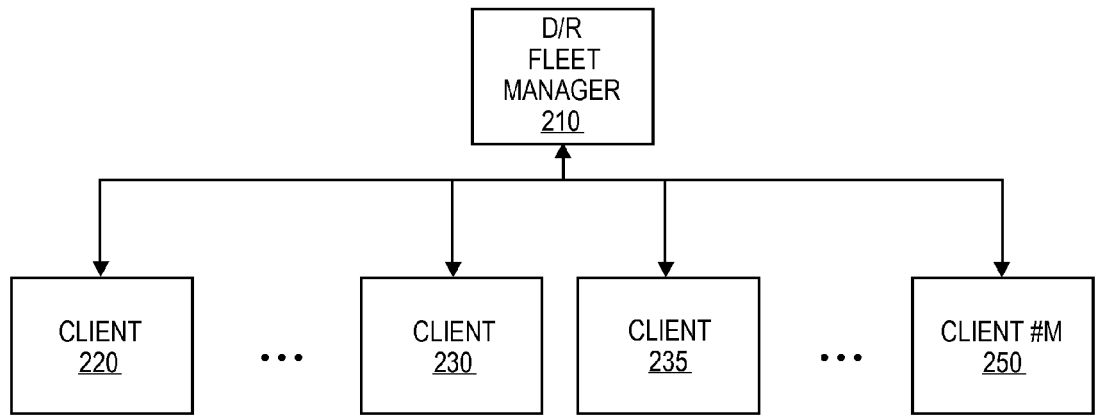
FIG. 2 is a block diagram of a D/R architecture that can be utilized to provide the operation as described herein.

FIG. 2 is a block diagram of a D/R architecture that can be utilized to provide the operation as described herein. In one embodiment, each of the client devices (e.g., 220, 230, 235, 250) are coupled with D/R fleet manager 210. In one embodiment, the communication between client devices 220, 230, 235, 250 and D/R fleet manager 210 is two-way communication. The client devices provide information on their D/R configurations and status, and D/R fleet manager 210 sends policy updates and specific D/R requests to the client devices that are based on the analytics performed within D/R fleet manager 210.

Figure 3:
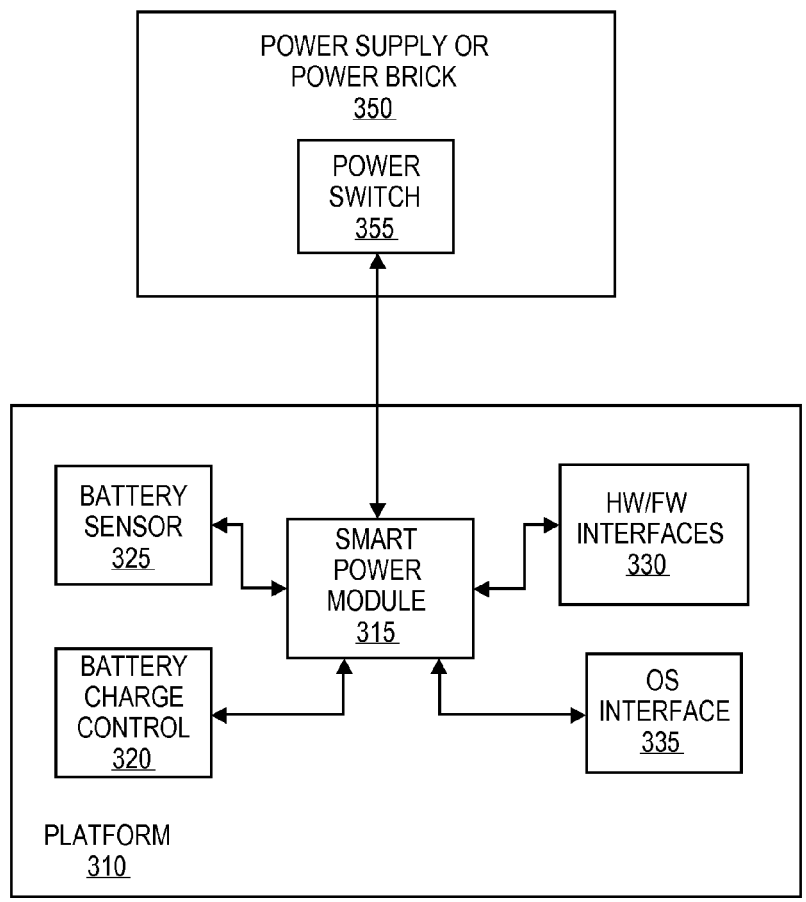
FIG. 3 is a block diagram of one embodiment of platform components for active demand/response control.

FIG. 3 is a block diagram of one embodiment of platform components for active demand/response control. In one embodiment, the components of FIG. 3 are included within the client devices of FIG. 2. In alternate embodiments, the components of FIG. 3 may be more distributed. In one embodiment, the platform may include a mechanism to allow a user to opt out, or override, the active (D/R) mechanisms described herein. This may be provided, for example, via a graphical user interface and/or a button/switch accessible to the user.

In one embodiment, smart power module 315 acts as the central D/R hub on platform 310 and is connected to the platform components of FIG. 1. In one embodiment, all D/R related measurements and actuations are initiated by smart power module 315. In one embodiment, smart power module 315 tracks total platform power and energy consumption.

In one embodiment, real-time analytics and/or machine learning mechanisms are provided by smart power module 315. Based on specific policies, this module can enforce the QoS guarantees by adapting the D/R mechanisms and D/R behavior of the system. For example, in an off-grid situation, when the battery capacity level is too low to guarantee a requested system run time, smart power module 315 can switch to grid power to satisfy the QoS requirement. If this option is not available, smart power module 315 can alter the power envelope of the platform by, for example, restricting high performance/high power states and/or adjusting other platform features to stay in a lower power mode.

Hardware/firmware (HW/FW) interfaces 330 provide bi-directional information flow between platform 310 and smart power module 315. For example HW/FW interfaces 330 can connect to Active Management Technology (AMT) components to enable D/R management when platform 310 is in a sleep state. AMT is available from Intel Corporation. Other technologies can also be used. Communication with the fleet manager can utilize the AMT interface and/or operating system (OS) interface 335.

In one embodiment, OS interface 335 provides the capability for smart power module 315 to communicate with the OS to, for example, obtain system utilization information that is only available within the OS. Further, it can provide a conduit to provide information from smart power module 315 to the OS and to user space applications and graphical interfaces.

In one embodiment, battery charge control 320 is capable of starting and stopping the charging process based on command signals from smart power module 315. In one embodiment, battery sensor 325 represents a smart battery that contains one or more sensors to provide, for example, battery capacity and charge rate.

In one embodiment, power switch 355 is coupled to communicate with smart power module 315 to control the connection of platform 310 to the energy grid. Based on a signal from smart power module 315, power switch 355 electrically connects platform 310 to, or disconnects platform 310 from, an A/C power source (e.g., wall outlet). Power switch 355 may report the current status (e.g., connected, disconnected) and if energy from the grid is currently available to smart power module 315. In one embodiment, power switch 355 is part of platform 310. In alternate embodiments, power switch 355 is part of a power brick 350 or part of a controllable outlet.

Figure 4:
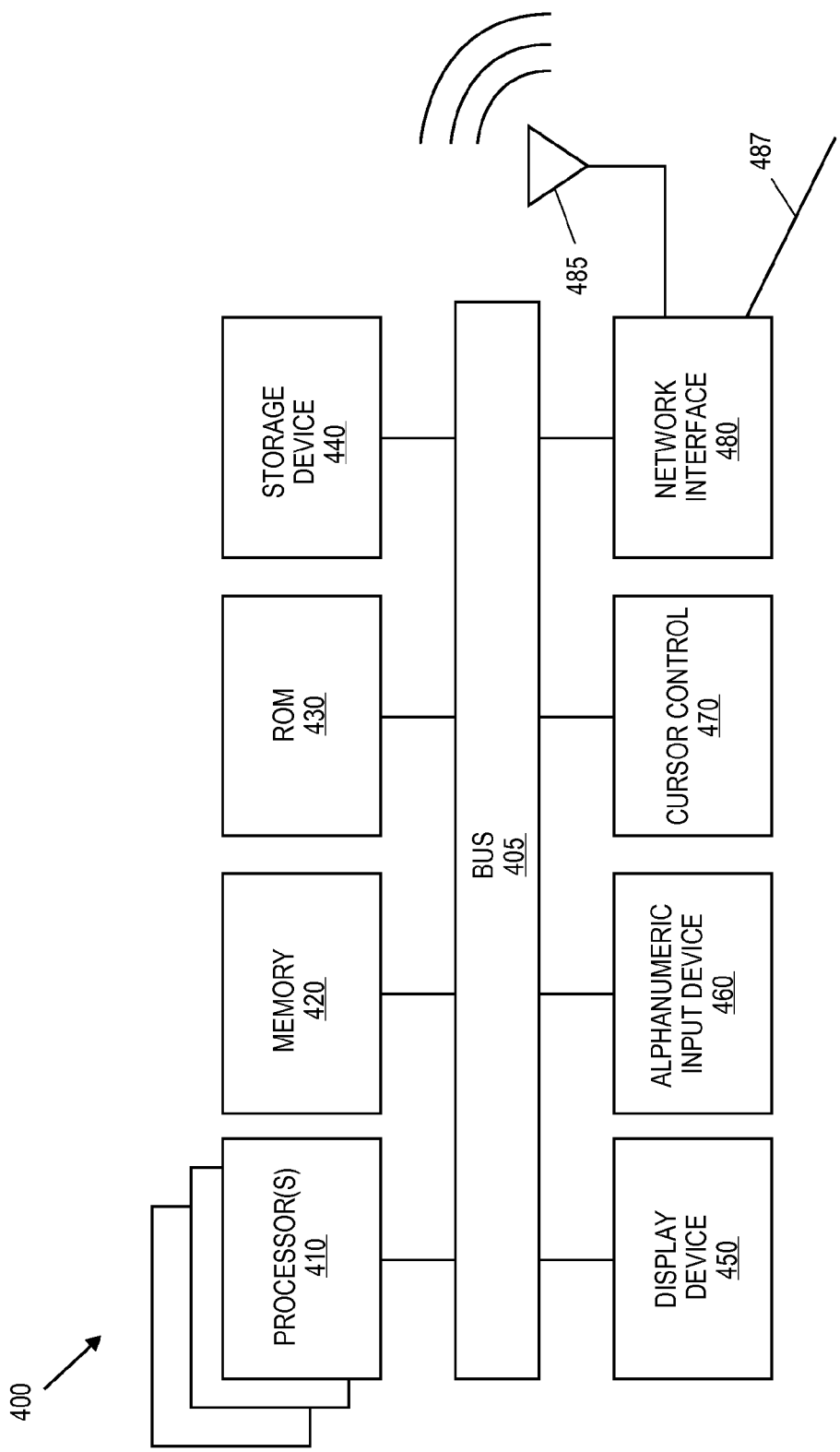
FIG. 4 is a block diagram of one embodiment of an electronic system.

FIG. 4 is a block diagram of one embodiment of an electronic system. The electronic system illustrated in FIG. 4 is intended to represent a range of electronic systems (either wired or wireless) including, for example, desktop computer systems, laptop computer systems, cellular telephones, tablets, etc. Alternative electronic systems may include more, fewer and/or different components. Electronic system 100 can be managed according to the techniques and mechanisms described herein.

Electronic system 400 includes bus 405 or other communication device to communicate information, and processor 410 coupled to bus 405 that may process information. While electronic system 400 is illustrated with a single processor, electronic system 400 may include multiple processors and/or co-processors. Electronic system 400 further may include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Electronic system 400 may also include read only memory (ROM) and/or other static storage device 430 coupled to bus 405 that may store static information and instructions for processor 410. Data storage device 440 may be coupled to bus 405 to store information and instructions. Data storage device 440 such as a magnetic disk or optical disc and corresponding drive may be coupled to electronic system 400.

Electronic system 400 may also be coupled via bus 405 to display device 450, such as a cathode ray tube (CRT) or liquid crystal display (LCD), to display information to a user. Alphanumeric input device 460, including alphanumeric and other keys, may be coupled to bus 405 to communicate information and command selections to processor 410. Another type of user input device is cursor control 470, such as a mouse, a trackball, or cursor direction keys to communicate direction information and command selections to processor 410 and to control cursor movement on display 450.

Electronic system 100 further may include network interface(s) 480 to provide access to a network, such as a local area network. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

In one embodiment, network interface(s) 480 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 5:
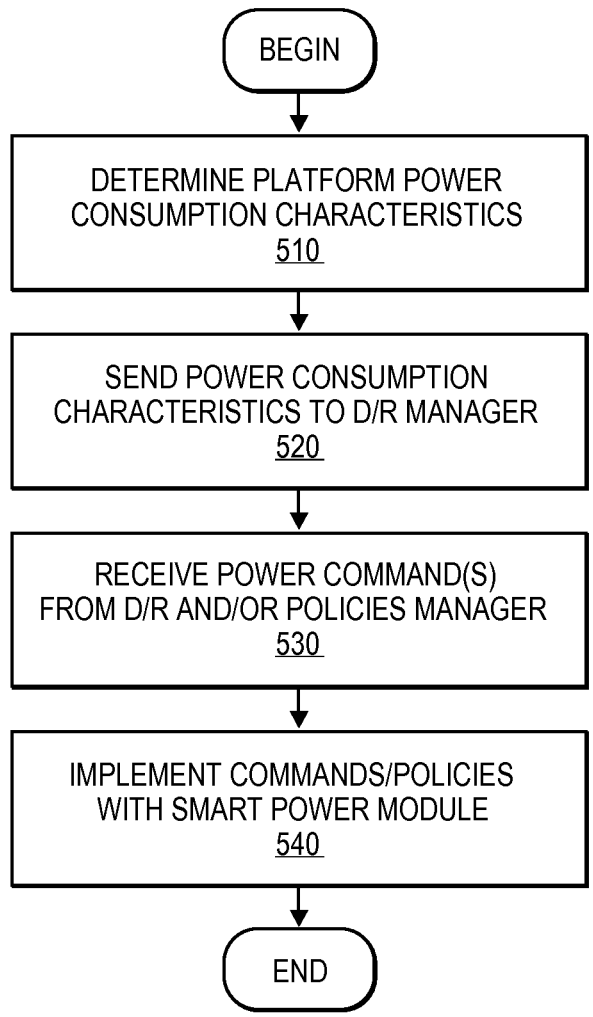
FIG. 5 is a flow diagram of one embodiment of a technique for operation of a platform within a demand/response managed system.

FIG. 5 is a flow diagram of one embodiment of a technique for operation of a platform within a demand/response managed system. The example of FIG. 5 describes the operation of an example smart power module. In one embodiment, each managed platform with in a system/site/building/location includes a smart power module that operates in conjunction with a management entity.

In one embodiment, the smart power module determines power consumption characteristics for the platform, 510. In one embodiment, this includes at least an estimate of the stored energy on the platform (e.g., battery charge level) and an estimate of the future energy consumption of the platform under the predicted workload. In one embodiment, the estimate of the future energy consumption of the platform under the predicted workload can be accomplished through machine learning from historical data that is collected by a smart power module to obtain an estimate of the future energy consumption with a relatively high confidence interval. Over time these estimates can increase in accuracy. Additional and/or different power consumption characteristics can also be utilized.

The power consumption characteristics are sent to a remote demand/response manager, 520. For example, the demand/response manager can be part of a building management system or a site management system or a network management system.

The demand/response manager analyzes the power consumption characteristics from multiple platforms and sends power commands and/or policies to the platforms. In one embodiment, the smart power module receives power commands and/or policies from the demand/response manager, 530. The smart power manager implements these commands and/or policies on the local platform, 540.

Figure 6:
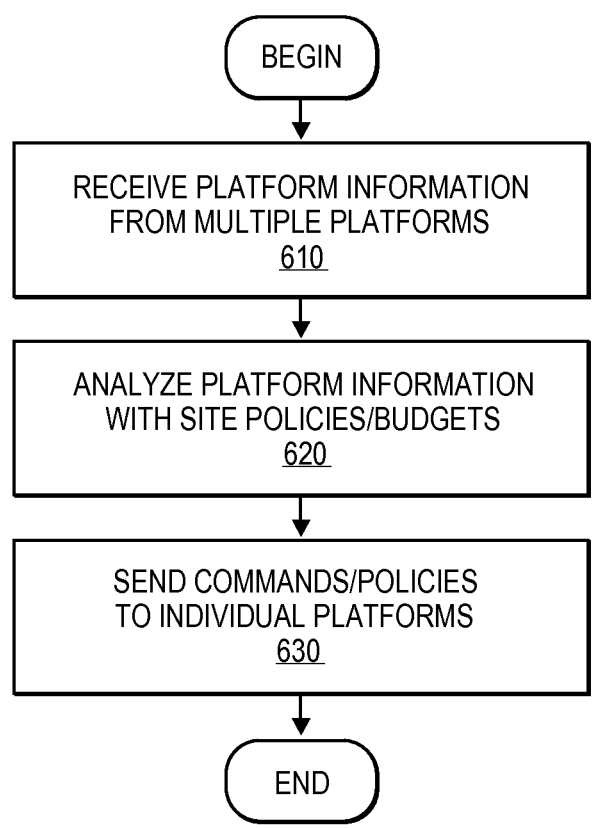
FIG. 6 is a flow diagram of one embodiment of a technique for operation of a demand/response manager.

FIG. 6 is a flow diagram of one embodiment of a technique for operation of a demand/response manager. The example of FIG. 6 describes the operation of an example demand/response manager. In one embodiment, each managed platform with in a system/site/building/location includes a smart power module that operates in conjunction with the demand/response manager.

Platform information is received from multiple platforms, 610. In one embodiment, this includes at least an estimate of the stored energy on the platform (e.g., battery charge level) and an estimate of the future energy consumption of the platform under the predicted workload. Additional and/or different power consumption characteristics can also be utilized.

The demand/response manager analyzes the platform information with site policies and/or budgets, 620. The demand/response manager sends commands and/or policies to the individual platforms, 630. In one embodiment, each platform may receive a different command and/or policies based on the analysis. Each platform may receive individual commands with site-wide policies.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a battery;
    one or more functional components to be powered by the battery, wherein the one or more functional components are part of a first platform; and
    a power module coupled with the one or more functional components, hardware/firmware interfaces, an operating system interface and a battery controller, wherein the power module is configured to estimate future energy consumption of the first platform under a predicted workload based on historical data collected by the power module, wherein the power module is configured to send first power consumption data including the estimate of the future energy consumption of the first platform to a remote demand/response management device that is configured to receive second power consumption data from a second platform, the power module to implement power policies received from the remote demand/response management device based at least on the first power consumption data and the second power consumption data to guarantee minimum availability and performance of the first platform, wherein guaranteeing minimum availability and performance of the first platform comprises 1) generating an estimate of the stored energy on the first platform; 2) generating an estimate of the future energy consumption of the first platform under a predicted workload; 3) reducing the first platform energy consumption; and 4) comparing the anticipated energy consumption with the available energy and adapting the first platform consumption to an extent possible or trigger charging the battery, and
    wherein the power module is configured to switch the first platform to a grid power when a capacity level of the battery is below a threshold to guarantee a requested system run time for the first platform.

2. The apparatus of claim 1 wherein the power module is to track power and energy consumption of the first platform.

3. The apparatus of claim 1 wherein the power module is to enforce quality of service (QoS) guarantees by adapting energy consumption behavior of the first platform.

4. The apparatus of claim 1 wherein the operating system interface is to provide a capability for the power module to communicate with the operating system to obtain system utilization information that is only available within the operating system.

5. The apparatus of claim 4 wherein the operating system interface is to provide information from the power module to the operating system and to user space applications and graphical interfaces.

6. The apparatus of claim 1 wherein the power module is to operate using real-time analytics and machine learning mechanisms.

7. An article comprising a non-transitory computer-readable medium having stored thereon instructions that, when executed, cause one or more processors to:
monitor first power consumption and a first battery charge level of a first platform having a first battery and a smart power module coupled to the first battery;
estimate future energy consumption of the first platform under a predicted workload based on historical data collected by the smart power module;
provide first information indicating at least one of the first power consumption, the first battery charge level and the future energy consumption for the first platform to a remote demand/response management device, wherein the remote demand/response management device is configured to receive second information including a second power consumption from a second platform;
receive by the smart power module a command to modify one or more power consumption characteristics of the first platform from the remote demand/response management device; and
cause by the smart power module, the one or more power consumption characteristics of the first platform to be changed in response to the command based at least on the first information and the second information, wherein the power module is configured to switch the first platform a grid power when the first battery capacity level is below a threshold to guarantee a requested system run time for the first platform, and
wherein the power module is coupled with one or more hardware/firmware interfaces, an operating system interface and a battery controller, wherein the power module is to implement power policies received from the remote demand/response management device based at least on the first information and the second information to guarantee minimum availability and performance of the first platform, wherein guaranteeing minimum availability and performance of the first platform comprises 1) generating an estimate of the stored energy on the first platform; 2) generating an estimate of the future energy consumption of the first platform under a predicted workload; 3) reducing the first platform energy consumption; and 4) comparing the anticipated energy consumption with the available energy and adapting the first platform consumption to an extent possible or trigger charging the battery.

8. The article of claim 7 wherein the power module is to enforce quality of service (QoS) guarantees by adapting energy consumption behavior of the first platform in response to one or more power policies received from the remote demand/response management device.

9. The article of claim 7 wherein the operating system interface is to provide a capability for the power module to communicate with the operating system to obtain system utilization information that is only available within the operating system.

10. The article of claim 9 wherein the operating system interface is to provide information from the power module to the operating system and to user space applications and graphical interfaces.

11. The method of claim 7 wherein the smart power module operates using real-time analytics and machine learning mechanisms.

12. The article of claim 7 wherein the hardware/firmware interfaces are to provide a bi-directional communication channel between the power module and the remote demand/response management device when the platform is in a sleep state.

13. A system comprising:
a demand/response manager, and
a plurality of client platform devices comprising a first client platform device and a second client platform device coupled with the demand/response manager, each of the plurality of client platform devices having one or more functional components and a power module coupled with the one or more functional components, one or more hardware/firmware interfaces, an operating system interface and a battery controller, wherein the power module of the first client platform device is configured to estimate future energy consumption of the first client platform device under a predicted workload based on historical data collected by the power module, wherein the power module of the first client platform device is configured to send first power consumption data including the estimate of the future energy consumption of the first client platform device to the demand/response manager that is configured to receive second power consumption data from the second client platform device, the power module of the first client platform device is configured to implement power policies received from the demand/response manager based at least on the first power consumption data and the second power consumption data to guarantee minimum availability and performance of the platforms, wherein guaranteeing minimum availability and performance of the platforms comprises 1) generating an estimate of the stored energy on the platforms; 2) generating an estimate of the future energy consumption of the platforms under a predicted workload; 3) reducing platform energy consumption; and 4) comparing the anticipated energy consumption with the available energy and adapting the platform consumption to an extent possible or trigger charging the battery, and wherein the power module of the first client platform device is configured to switch to a grid power when a battery capacity level is below a threshold to guarantee a requested system run time for the first platform.

14. The system of claim 13 wherein the power module is to track platform power and energy consumption for the respective platforms.

15. The system of claim 13 wherein the power module is to enforce quality of service (QoS) guarantees by adapting energy consumption behavior of the respective platforms.

16. The system of claim 13 wherein the operating system interface is to provide a capability for the power module to communicate with the operating system to obtain system utilization information that is only available within the operating system.

17. The system of claim 16 wherein the operating system interface is to provide information from the power module to the operating system and to user space applications and graphical interfaces.

18. The system of claim 13 wherein the power module is to operate using real-time analytics and machine learning mechanisms.

* * * * *